(12) United States Patent
Cho et al.

(10) Patent No.: US 9,514,321 B2
(45) Date of Patent: Dec. 6, 2016

(54) ELECTRO DEVICE FOR PROTECTING USER'S PRIVACY AND METHOD FOR CONTROLLING THEREOF

(71) Applicant: Samsung Electronics Co., Ltd., Suwon-si, Gyeonggi-do (KR)

(72) Inventors: Sung-Jae Cho, Hwaseong-si (KR); Hyuk-In Kwon, Seongnam-si (KR); Chang-Sun Song, Gwacheon-si (KR); Hyung-Hun Cho, Hwaseong-si (KR); Jeong-Eun Choi, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 142 days.

(21) Appl. No.: 14/265,829

(22) Filed: Apr. 30, 2014

(65) Prior Publication Data
US 2014/0331043 A1    Nov. 6, 2014

(30) Foreign Application Priority Data

May 2, 2013    (KR) .................. 10-2013-0049648

(51) Int. Cl.
| | | |
|---|---|---|
| *G06F 21/62* | (2013.01) | |
| *H04L 9/08* | (2006.01) | |
| *H04L 9/32* | (2006.01) | |
| *H04W 12/08* | (2009.01) | |
| *G06F 21/10* | (2013.01) | |
| *H04L 29/06* | (2006.01) | |
| *H04W 12/02* | (2009.01) | |
| *H04W 12/04* | (2009.01) | |

(52) U.S. Cl.
CPC .......... *G06F 21/6209* (2013.01); *G06F 21/10* (2013.01); *H04L 9/0844* (2013.01); *H04L 9/3215* (2013.01); *H04W 12/08* (2013.01); *H04L 63/045* (2013.01); *H04L 2209/80* (2013.01); *H04W 12/02* (2013.01); *H04W 12/04* (2013.01)

(58) Field of Classification Search
CPC .......... G06F 21/60; G06F 21/31; G06F 21/10; G06F 21/305; G06F 11/30; G06F 21/62; G06F 21/6209; H04L 9/08
USPC ........ 713/165, 169; 726/3, 30; 380/277–278
See application file for complete search history.

(56) References Cited

U.S. PATENT DOCUMENTS

| | | | | |
|---|---|---|---|---|
| 7,073,073 | B1 * | 7/2006 | Nonaka | ........... G06F 21/10 380/277 |
| 7,499,551 | B1 * | 3/2009 | Mire | .............. H04L 9/006 380/277 |
| 9,183,358 | B2 * | 11/2015 | Inooka | ........... G06F 21/10 |
| 2002/0032866 | A1 | 3/2002 | Suga | |
| 2005/0193201 | A1 * | 9/2005 | Rahman | ......... G06F 21/305 713/169 |
| 2014/0196158 | A1 * | 7/2014 | Buck | ............. G06F 21/31 726/30 |

* cited by examiner

*Primary Examiner* — Thanhnga B Truong
(74) *Attorney, Agent, or Firm* — Jefferson IP Law, LLP

(57) ABSTRACT

A method of controlling a first electronic device to acquire content in cooperation with a second electronic device is provided. The method includes performing a mutual authorization, acquiring content, generating an encryption key based on a first personal key and a second public key of the first electronic device, encrypting the content based on the encryption key, and storing the encrypted content.

24 Claims, 15 Drawing Sheets

ELECTRO DEVICE FOR PROTECTING USER'S PRIVACY AND METHOD FOR CONTROLLING THEREOF

CROSS-REFERENCE TO RELATED APPLICATION(S)

This application claims the benefit under 35 U.S.C. §119(a) of a Korean patent application filed on May 2, 2013 in the Korean Intellectual Property Office and assigned Serial number 10-2013-0049648, the entire disclosure of which is hereby incorporated by reference.

TECHNICAL FIELD

The present disclosure relates to an electronic device for protecting user's privacy and a method of controlling thereof.

BACKGROUND

Recently, a smart phone or a tablet Personal Computer (PC) has been rapidly popularized. According to the related art, the smart phone or the tablet PC generally includes a camera module, and users can take a picture of a desired subject with the camera module. The smart phone or the tablet PC may store images captured by the camera module. The user can control the smart phone or the tablet PC to load and display the stored images on a screen at a desired time.

In addition, the user may take a picture to be securely managed along with another user. For example, a technology of requiring permission from two users has been developed in order to store secret images and to reproduce the secret images. According to the related art, the user and another user set the smart phone or the tablet PC to require permission from both users when a certain image is reproduced, thereby preventing one of the users from revealing the certain image to another user (e.g., without permission to view the image).

According to the related art, the smart phone or tablet PC has controlled a reproduction of a certain photograph based on a secret sharing technique. For example, a first electronic device which a first user uses may take a certain photograph. In this case, the first electronic device may divide the certain photograph into a first divided photograph and a second divided photograph. The first electronic device may store only the first divided photograph, and transmit the second divided photograph to a second electronic device. Thereafter, the second electronic device may store the second divided photograph.

If the first user wants to reproduce the photograph, the first electronic device requests the second user to transmit the second divided photograph thereto. The first electronic device may receive the second divided photograph and combine the second divided photograph with the first divided photograph. As a result, the first electronic device may reproduce the complete photograph. For example, in order to reproduce the complete photograph, permission from both first user and second user is required.

However, the secret sharing technique according to the related art requires an algorithm for dividing the photograph. Furthermore, because the secret sharing technique for only black-and-white photographs has been developed, there is a problem in that such a technique cannot be applied to color photographs. In addition, there is a problem in that one electronic device cannot reproduce the photograph when the divided photograph stored in another electronic device is lost.

Therefore, there is a need for development of a new electronic device for protecting privacy and a method of controlling thereof.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device using an asymmetric encryption and a method of controlling the same.

In accordance with an aspect of the present disclosure, a method of controlling a first electronic device to acquire content in cooperation with a second electronic device is provided. The method includes, performing a mutual authorization, acquiring the content, generating an encryption key based on a first personal key and a second public key of the first electronic device, encrypting the content based on the encryption key, and storing the encrypted content.

In accordance with another aspect of the present disclosure, a first electronic device for acquiring content in cooperation with a second electronic device is provided. The first electronic device includes a communication unit which configured to receive a second public key from the second electronic device, and to transmit a first public key of the first electronic device, a content acquiring unit configured to acquire the content, a controller configured to identify that the second electronic device is a subject to cooperatively acquire the content, to generate an encryption key based on a first personal key and a second public key of the first electronic device, and to encrypt the content based the encrypted key, and a storing unit configured to store the encrypted content.

In accordance with another aspect of the present disclosure, a method of controlling a second electronic device to acquire content in cooperation with a first electronic device is provided. The method includes identifying that the first electronic device is a subject to cooperatively acquire the content so as to perform a mutual authorization by transmitting a second public key to the first electronic device, receiving a first public key of the first electronic device, and generating an encryption key based on a second personal key of the second electronic device and the first public key.

In accordance with still another aspect of the present disclosure, a second electronic device for acquiring content in cooperation with a first electronic device is provided. The second electronic device includes a communication unit configured to transmit a second public key to the first electronic device, and to receive a first public key of the first electronic device, a controller configured to identify that the first electronic device is a subject to cooperatively acquire the content, and to generate an encryption key based on a second personal key of the first electronic device and the first public key, and a storing unit configured to store the encrypted content.

According to various embodiments of the present disclosure, the electronic device using the asymmetric encryption and the method of controlling the same can be provided.

Thus, although an encrypted key is transmitted through a public path, it can be prevented that the encryption key is exposed by someone. Further, it is possible to prevent the encryption key from being exposed and also to prevent an exposure of the photograph.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
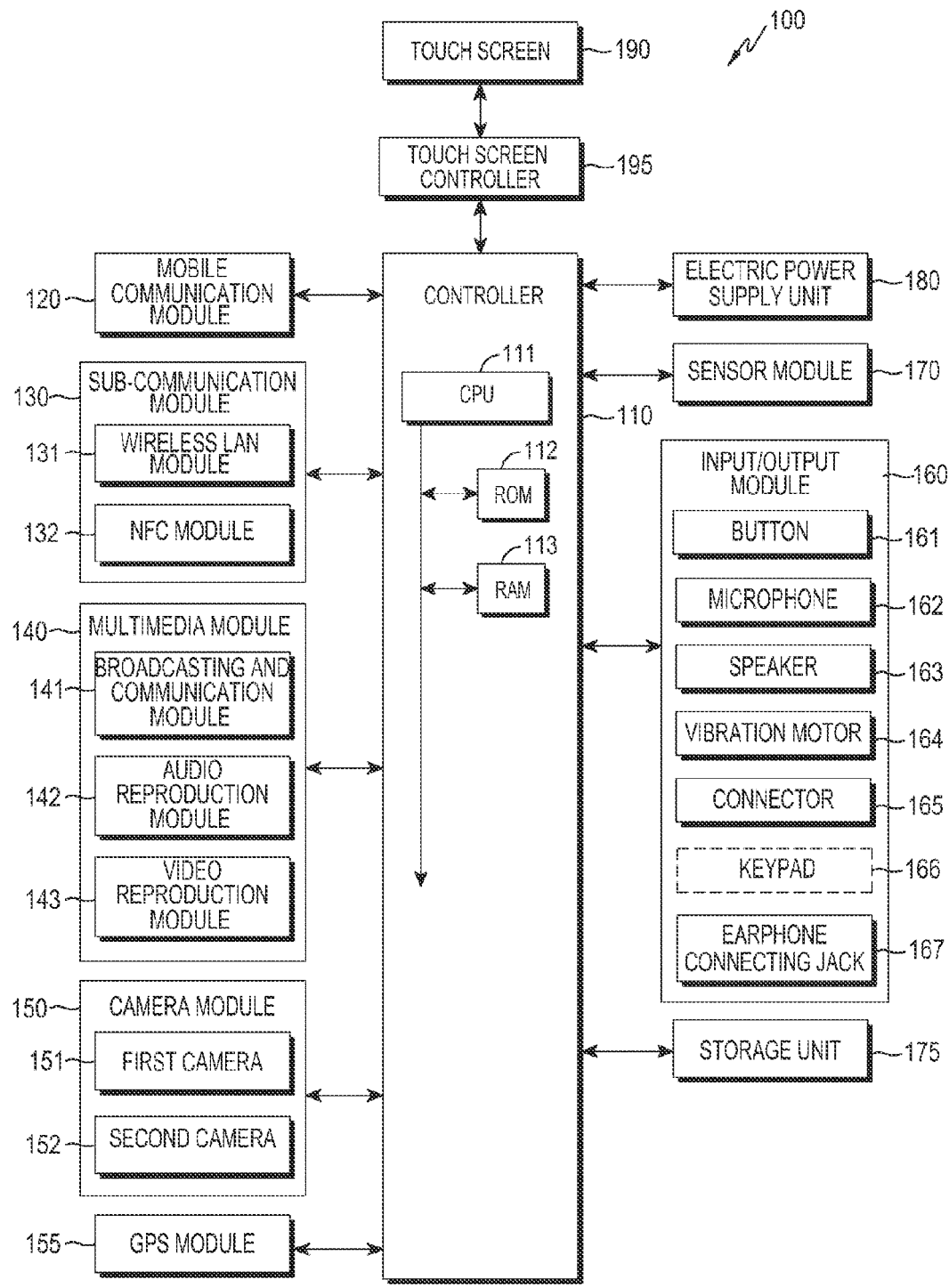
FIG. 1 is a block diagram schematically illustrating an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

While terms including ordinal numbers, such as "first" and "second," and the like, may be used to describe various components, such components are not limited by the above terms. The terms are used merely for the purpose to distinguish an element from the other elements. For example, a first element could be termed a second element, and similarly, a second element could be also termed a first element without departing from the scope of the present disclosure. As used herein, the term "and/or" includes any and all combinations of one or more of the associated listed items.

The terms used in this application is for the purpose of describing particular various embodiments only and is not intended to be limiting of the disclosure. As used herein, the singular forms are intended to include the plural forms as well, unless the context clearly indicates otherwise. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Unless defined otherwise, all terms used herein have the same meaning as commonly understood by those of skill in the art. Such terms as those defined in a generally used dictionary are to be interpreted to have the meanings equal to the contextual meanings in the relevant field of art, and are not to be interpreted to have ideal or excessively formal meanings unless clearly defined in the present specification. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk ("DVD") player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography ("CT") device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

FIG. 1 is a block diagram schematically illustrating an electronic device according to an embodiment of the present disclosure.

Referring to FIG. 1, the electronic device 100 may include a controller 110, a mobile communication module 120, a sub-communication module 130, a multimedia module 140, a camera module 150, a GPS module 155, an input/output module 160, a sensor module 170, a storage unit 175, an electric power supply unit 180, a touch screen 190, and a touch screen controller 195.

According to various embodiments of the present disclosure, the electronic device 100 may be connected to an external device (not shown) by using an external device connector such as a sub-communication module 130, a connector 165, and an earphone connecting jack 167. The "external device" may include various devices such as an earphone, an external speaker, a Universal Serial Bus (USB) memory, a charger, a cradle, a docking station, a DMB antenna, a mobile payment device, a health-care device (e.g., blood sugar meter, and/or the like), a game player, a car navigation device, and the like, which are detachably attached to the electronic device 100 by a wired cable. Further, the "external device" may include a Bluetooth communication device, a short-range communication device such as a Near Field Communication (NFC) device, a WiFi Direct communication device, a wireless Access Point (AP), and/or the like, which may be wirelessly connected to the electronic device 100 through a short-range communication. In addition, the external device may include another device, a portable phone, a smart phone, a tablet PC, a desktop PC, a server, and/or the like.

The sub-communication module 130 includes at least one of a wireless Local Area Network (LAN) module 131, a short-range communication module (e.g., a NFC module) 132, and/or the like.

The multimedia module 140 includes at least one of a broadcasting and communication module 141, an audio reproduction module 142, a video reproduction module 143, and/or the like.

The camera module 150 includes at least one of a first camera 151 and a second camera 152, and/or the like.

The input/output module 160 includes at least one of a button 161, a microphone 162, a speaker 163, a vibration motor 164, a connector 165, a keypad 166, an earphone connecting jack 167, and/or the like.

The controller 110 may include a Central Processing Unit (CPU) 111, a Read-Only Memory (ROM) 112 storing a control program for controlling the electronic device 100, and a Random Access Memory (RAM) 113 used as a storage area for storing a signal or data input from the outside of the electronic device 100 or for work performed in the electronic device 100. According to various embodiments of the present disclosure, the CPU 111 may include a various number of cores. For example, the CPU 111 may include a single core processor, a dual core processor, a triple core processor, a quad core processor, or the like. The CPU 111, the ROM 112 and the RAM 113 may be connected with one another through internal buses.

The controller 110 can control the mobile communication module 120, the sub-communication module 130, the multimedia module 140, the camera module 150, the GPS module 155, the input/output module 160, the sensor module 170, the storage unit 175, the electric power supply unit 180, the touch screen 190, and the touch screen controller 195.

The mobile communication module 120 connects the display device 100 with the external device through mobile communication by using one or more antennas (not shown) under a control of the controller 110. The mobile communication module 120 transmits/receives a radio signal for a voice call, a video call, a Short Message Service (SMS), or a Multimedia Message Service (MMS) to/from a mobile phone (not shown), a smart phone (not shown), a tablet PC, or another device (not shown) having a phone number input into the electronic device 100.

The sub-communication module 130 may include at least one of the wireless LAN module 131 and the short-range communication module 132. For example, the sub-communication module 130 may include only the wireless LAN module 131, only the short-range communication module 132, or both the wireless LAN module 131 and the short-range communication module 132.

The wireless LAN module 131 may be connected with the Internet in a place at which a wireless Access Point (AP) (not shown) is installed. The wireless LAN module 131 may be connected with the Internet under a control of the controller 110. The wireless LAN module 131 supports a wireless LAN standard (IEEE802.11x) of the Institute of Electrical and Electronics Engineers (IEEE). The short-range communication module 132 may wirelessly perform short-range communication between the electronic device 100 and an image forming device (not shown) under a control of the controller 110. A short-range communication scheme may include a Bluetooth communication scheme, an Infrared Data Association (IrDA) communication scheme, a WiFi-Direct communication scheme, a NFC scheme, and/or the like.

The electronic device 100 may include at least one of the mobile communication module 120, the wireless LAN module 131, and the short-range communication module 132 according to a performance thereof. For example, the electronic device 100 may include a combination of the mobile communication module 120, the wireless LAN module 131, and the short-range communication module 132 according to a performance of the electronic device 100.

The multimedia module 140 may include the broadcasting and communication module 141, the audio reproduction module 142, the video reproduction module 143, and/or the like. The broadcasting and communication module 141 can receive a broadcasting signal (e.g., a TV broadcasting signal, a radio broadcasting signal, a data broadcasting signal, and/or the like), and broadcasting supplement information (e.g., Electric Program Guide (EPG), Electric Service Guide (ESG), and/or the like), output from a broadcasting station through a broadcasting and communication antenna (not shown) under a control of the controller 110. The audio reproduction module 142 may reproduce a stored or received digital audio file (e.g., a file having a file extension of mp3, wma, ogg, way, and/or the like) under a control of the controller 110. The video reproducing module 143 may reproduce a stored or received digital video file (e.g., a file of which the file extension is mpeg, mpg, mp4, avi, mov, mkv, and/or the like) under the control of the control unit 110. The video reproducing module 143 may reproduce a digital audio file.

The multimedia module 140 may include the audio reproduction module 142 and the video reproduction module 143 except for the broadcasting and communication module 141. Further, the audio reproduction module 142 or the video reproduction module 143 of the multimedia module 140 may be included in the controller 110.

The camera module 150 may include at least one of the first camera 151 and the second camera 152 each of which may photograph (e.g., capture) a stationary image or a video under the control of the control unit 110. Further, the first camera 151 or the second camera 152 may respectively include an auxiliary light source (e.g., a flash) (not shown), providing light required for the photographing. According to various embodiments of the present disclosure, the first camera 151 may be disposed on the front surface of the electronic device 100 and the second camera 152 may be disposed on the rear surface of the electronic device 100. According to various embodiments of the present disclosure, the first camera 151 and the second camera 152 may be disposed to be adjacent to each other (e.g., an interval between the first camera 151 and the second camera 152 is larger than 1 cm and smaller than 8 cm), and thus a three-dimensional stationary image or a three-dimensional video may be photographed.

The GPS module 155 may receive radio waves from a plurality of GPS satellites (not shown) in Earth's orbit and calculate a position of the electronic device 100 by using Time of Arrival from the GPS satellites to the electronic device 100.

The input/output module 160 may include at least one of a plurality of buttons 161, a microphone 162, a speaker 163, a vibration motor 164, a connector 165, a keypad 166, and/or the like.

The button 161 may be formed on a front surface, a side surface, or a rear surface of a housing of the electronic device 100, and may include at least one of a power/lock button, a volume button, a menu button, a home button, a back button, a search button, and/or the like.

The microphone 162 receives a voice or a sound to generate an electrical signal under a control of the controller 110.

The speaker 163 may output sounds corresponding to various signals (e.g., a wireless signal, a broadcasting signal, a digital audio file, a digital video file, photographing, and/or the like) of the mobile communication module 120, the sub-communication module 130, the multimedia module 140, or the camera module 150 to the outside of the electronic device 100 under a control of the controller 110. The speaker 163 may output a sound (e.g., a button operation sound or a ringtone corresponding to a voice call), corresponding to a function performed by the electronic device 100. One or more speakers 163 may be formed on a proper position or positions of the housing of the electronic device 100.

The vibration motor 164 can convert an electric signal to mechanical vibration under the control of the control unit 110. For example, when the electronic device 100 in a vibration mode receives a voice call from another device (not shown), a vibration motor is operated. One vibration motor 164 or a plurality of vibration motors 164 may be arranged within the housing of the electronic device 100. The vibration motor 164 is capable of operating in response to a touch operation of a user who touches the touch screen 190, and a continuous movement of a touch on the touch screen 190.

The connector 165 may be used as an interface for connecting the electronic device 100 with an external device (not shown) or an electric power source (not shown). The electronic device 100 may transmit or receive data stored in the storage unit 175 of the electronic device 100 to or from an external device (not shown) through a wired cable connected to the connector 165 under a control of the controller 110. At this time, the external device may be a docking station, and the data may be an input signal transmitted from an external input device (e.g., a mouse, a keyboard, and/or the like). Further, the electronic device 100 may receive electric power from an electric power source (not shown) through the wired cable connected to the connector 165 or charge a battery (not shown) by using the electric power source.

The keypad 166 may receive a key input from the user for the control of the electronic device 100. The keypad 166 includes a physical keypad (not shown) formed in the electronic device 100 or a virtual keypad (not shown) displayed on the touch screen 190. The physical keypad (not shown) formed in the electronic device 100 may be excluded according to the performance or a structure of the electronic device 100.

An earphone (not shown) may be inserted into the earphone connecting jack 167 to be connected with the electronic device 100.

The sensor module 170 includes at least one sensor for detecting a state of the electronic device 100. For example, the sensor module 170 may include a proximity sensor for detecting proximity of a user to the electronic device 100, an illumination sensor for detecting the amount of light near the electronic device 100, and/or the like. Further, the sensor module 170 may include a gyro sensor, and/or the like. The gyro sensor may detect the operation of the electronic device 100 (e.g., rotation of the electronic device 100), and acceleration or vibration applied to the electronic device 100, may detect a point of the compass using the magnetic field on Earth, and may detect a gravity acting direction. Further, the sensor module 170 may include an altimeter for measuring an atmospheric pressure to detect an altitude, and/or the like. At least one sensor may detect the state, generate a signal corresponding to the detection, and transmit the generated signal to the controller 110. The sensors of the sensor module 170 may be added or omitted according to the capability of the electronic device 100.

The storage unit 175 may store signals or data input/output in response to the operations of the mobile communication module 120, the sub-communication module 130, the multimedia module 140, the camera module 150, the GPS module 155, the input/output module 160, the sensor module 170, and the touch screen 190 under the control of the control unit 110. The storage unit 175 may store a control program and applications for controlling the electronic device 100 or the controller 110.

The term "storage unit" includes the storage unit 175, the ROM 112 and the RAM 113 within the controller 110, or a memory card (not shown) (e.g., an SD card, a memory stick, and/or the like) inserted in the electronic device 100. The storage unit may include a non-volatile memory, a volatile memory, a Hard Disc Drive (HDD) a Solid State Drive (SSD), and/or the like.

The electric power supply unit 180 may supply electric power to one or more batteries (not shown) disposed in the housing of the electronic device 100 under a control of the controller 110. The one or more batteries (not shown) supply electric power to the electronic device 100. Further, the electric power supply unit 180 may supply the electronic device 100 with electric power input from an external electric power source (not shown) through the wired cable connected to the connector 165. In addition, the electric power supply unit 180 may supply the electronic device 100 with electric power wirelessly input from the external electric power source by using a wireless charging technology.

The touch screen 190 may include a touch panel. The touch screen 190 provides a user with a User Interface (UI) corresponding to various services (e.g., a voice call, a data transmission, broadcasting, photographing, and/or the like). The touch screen 190 can transmit an analog signal, which corresponds to at least one touch input into the user interface, to the touch screen controller 195. The touch screen 190 may receive at least one touch caused by a body of the user (e.g., fingers including a thumb, and/or the like), or a touchable input means (e.g., a stylus pen, and/or the like). In addition, the touch screen 190 may receive a continuous movement of one touch among one or more touches. The touch screen 190 may transmit an analog signal, which corresponds to the continuous movement of the touch input thereto, to the touch screen controller 195.

According to various embodiments of the present disclosure, the touch is not limited to a contact between the touch screen 190 and the user's body or a touchable input means, and may include a non-contact. A distance of the non-contact detected by the touch screen 190 may be changed according to the performance or the structure of the electronic device 100.

The touch screen 190 may be implemented, for example, in a resistive type, a capacitive type, an Electro Magnetic Resonance (EMR) type, an infrared type, an acoustic wave type of touch screen, and/or the like, and also may be implemented in at least one combination thereof.

The touch screen controller 195 converts the analog signal received from the touch screen 190 to a digital signal (e.g., X and Y coordinates), and transmits the digital signal to the controller 110. The controller 110 may control the touch screen 190 by using the digital signal received from the touch screen controller 195. For example, the controller 110 may allow a short-cut icon (not shown), which is displayed on the touch screen 190, to be selected, or may execute the short-cut icon (not shown) in response to a touch. Further, the touch screen controller 195 may be included in the controller 110.

The controller 110 may encrypt content such as a photograph, a video file, an audio file, and/or the like. For example, the controller 110 may encrypt or decrypt content by generating an encryption key or using a received encryption key. Operation of the controller 110 will be described in detail later. According to various embodiments of the present disclosure, the camera module 150 or the microphone 162 for acquiring the content such as a photograph, a video file, an audio file, and the like may be generally referred to as a content acquiring unit.

Figure 2:
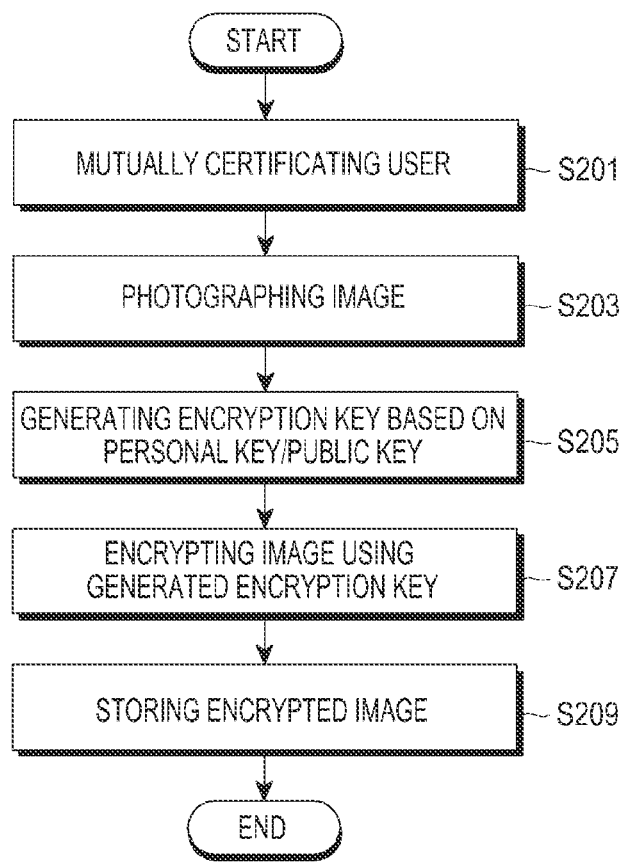
FIG. 2 is a flowchart illustrating a process of controlling an electronic device according to an embodiment of the present disclosure.

FIG. 2 is a flowchart illustrating a process of controlling an electronic device according to an embodiment of the present disclosure.

Referring to FIG. 2, the electronic device 100 may acquire the content such as a photograph, a video file, an audio file, and/or the like.

At operation S201, the electronic device 100 may perform mutual authorization between users required to give permission when the content is reproduced. For example, the electronic device 100 according to various embodiments of the present disclosure is required to receive permission from the other electronic device when the content is reproduced. The other electronic device also is required to receive permission from the electronic device 100 when the content is reproduced. Therefore, the electronic device 100 performs a predetermined process so as to determine that a certain electronic device is an object to which a permission required to reproduce the content is transmitted. In addition, an authorization process for determining the object to be permitted may be required. A mutual authorization process performed at operation S201 will be described in more detail with reference to FIG. 3 later.

If the mutual authorization is completed at operation S201, then the electronic device 100 may proceed to operation S203 at which the electronic device 100 can acquire the content. For example, according to various embodiments of the present disclosure, the camera module 150 of the electronic device 100 may photograph a desired subject. According to various embodiments of the present disclosure, the camera module 150 of the electronic device 100 may record a video of a specific scene. According to various embodiments of the present disclosure, the microphone 162 of the electronic device 100 may collect a desired voice.

At operation S205, the electronic device 100 may create an encryption key based on a personal key stored therein and a security key received from the other electronic device. According to various embodiments of the present disclosure, the electronic device 100 may create an encryption key based on the Diffie-Hellman algorithm, and the creation of the encryption key will be described in detail later.

At operation S207, the electronic device 100 may encrypt the acquired content with the created encryption key.

At operation S209, the electronic device 100 may store the encrypted content. For example, the electronic device 100 may store an encrypted photograph, video, voice, and/or the like.

Figure 3:
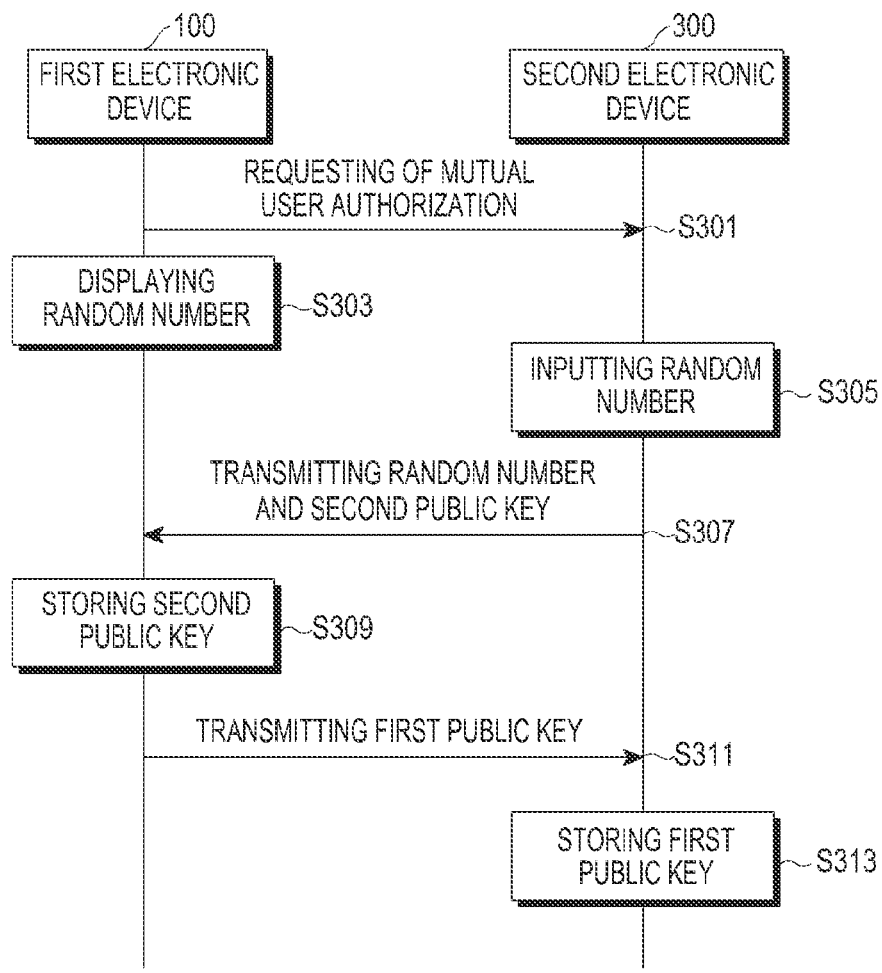
FIG. 3 is a flowchart illustrating a mutual authorization of a first electronic device and a second electronic device according to an embodiment of the present disclosure.

FIG. 3 is a flowchart illustrating a mutual authorization of a first electronic device and a second electronic device according to an embodiment of the present disclosure.

Referring to FIG. 3, an example of operation S201 of FIG. 2 may be shown. The various embodiments of the present disclosure illustrated in FIG. 3 will be described in detail with reference to FIGS. 4A to 4D.

Figure 4A:
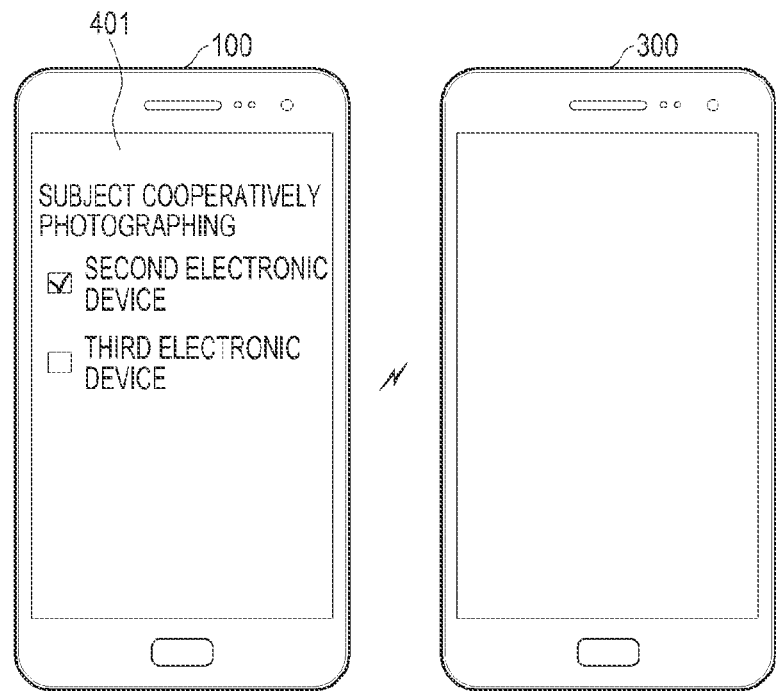
FIGS. 4A, 4B, and 4C are conceptual views illustrating electronic devices according to an embodiment of the present disclosure.
Figure 4B:
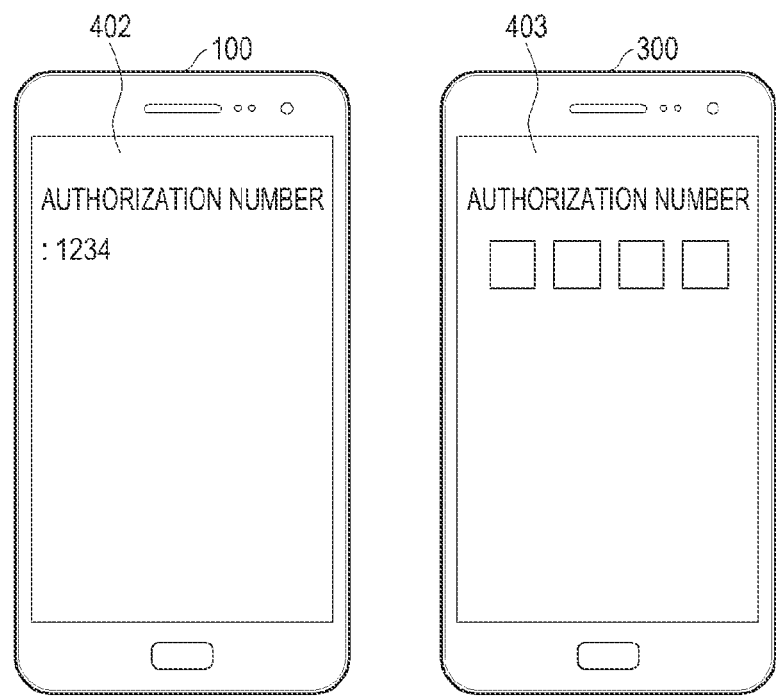
Figure 4C:
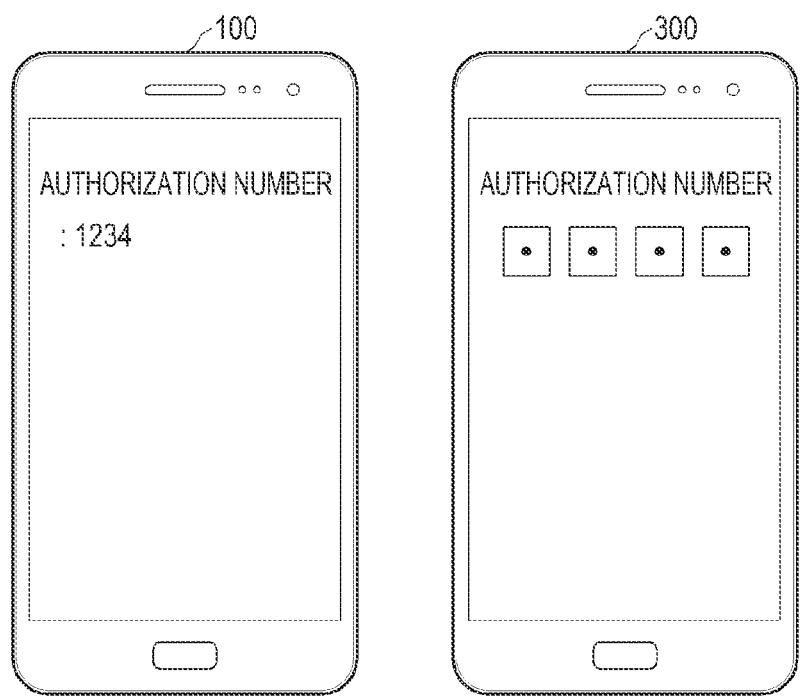

FIGS. 4A, 4B, and 4C are conceptual views illustrating electronic devices according to an embodiment of the present disclosure.

Referring to FIG. 2, as described above, at operation S201, the electronic device 100 may perform mutual authorization between users required to receive permission when the content is reproduced. For example, if the encrypted content is reproduced as shown in FIG. 2, the first electronic device 100 is generally required to receive permission from the second electronic device 300. For example, a first user using the first electronic device 100 and a second user using the second electronic device 300 may enter into an agreement in which permission of both users must be input to reproduce certain content when the certain content is acquired. Accordingly, the first electronic device 100 and the second electronic device 300 may perform mutual authorization indicating that authorization from the first electronic device 100 and the second electronic device 300 is required to be permitted to reproduce of the content.

Referring to FIGS. 3 and 4A, at operation S301, the first electronic device 100 may transmit a signal of requesting a user mutual authorization to the second electronic device 300. For example, as illustrated in FIG. 4A, the first electronic device 100 may display a screen 401 for a user to select a cooperative photographing subject. The first electronic device 100 may display a list of the cooperative photographing subjects (e.g., a list including the second electronic device, and/or a third electronic device), on the screen. The first electronic device 100 may previously store at least one of the application identifier and the IP address of other electronic devices which perform the cooperative photographing, and identifier information on short-range communication such as Bluetooth, and/or the like. For example, the first electronic device 100 may display the application identifier of other electronic devices capable of performing a cooperative photographing. The first electronic device 100 may link the application identifier to a telephone directory in which the identifier is previously stored, so as to display the identifier as an identifier recorded in the telephone directory.

The first electronic device 100 may further display a window through which the user selects one of other electronic devices. For example, as illustrated in FIG. 4A, the user may select one of the windows the second electronic device 300 as an electronic device which performs the cooperative photographing.

The first electronic device 100 may transmit a signal of requesting mutual user authorization to the second electronic device 300. The signal of requesting the mutual user authorization may include at least one of the identifier, the IP address, and information on an identifier of a short-range communication scheme such as a Bluetooth scheme of the first electronic device 100. In addition, the first electronic device 100 may further include an aspect of performing the photographing in cooperation with the second electronic device 300. For example, a first communication unit of the first electronic device 100 may transmit the signal of requesting the user mutual authorization to a second communication unit of the second electronic device 300. In addition, the controller of the first electronic device 100 may generate the signal of requesting the user mutual authorization, and control the first communication unit to transmit the signal.

At operation S303, the first electronic device 100 may display a random number. As an example, as illustrated in FIG. 4B, the first electronic device 100 may generate 1234 corresponding to the random number, and display the generated random number on the screen 402. As illustrated in FIG. 4B, the random number is shown as four digit number, however, the number of digits of the random number is merely an example.

Thereafter, or contemporaneously, the second electronic device 300 may display a window 403 on which the user inputs the random number, when the second device 300 receives a signal of requesting user mutual authorization. The second electronic device 300 may store at least one of the identifier, the IP address, and information on an identifier of the short-range communication scheme such as Bluetooth of the first electronic device 100, which are included in the signal of requesting the mutual user authorization. Additionally, the second electronic device 300 may display the window 403 on which a user thereof inputs the random number displayed on the first electronic device 100.

According to various embodiments of the present disclosure, the second user may identify the random number displayed on the first electronic device 100 by directly viewing the first electronic device 100. According to various embodiments of the present disclosure, the second user may identify the random number through a voice call, a reception of an SMS, and/or the like by using the second electronic device 300.

At operation S305, the second electronic device 300 may receive an input of the random number from the second user. For example, as illustrated in FIG. 4C, the second electronic device 300 may receive an input of the random number. The second electronic device 300 may be controlled not to display the input random number for security.

At operation S307, the second electronic device 300 may transmit the input random number and a second public key which is a public key of the second electronic device, to the first electronic device 100. The second electronic device 300 may generate a second personal key and the second public key, for example, based on the Diffie-Hellman algorithm. As an example, the second electronic device 300 may generate the second personal key and the second public key, when receiving an input of the random number. However, there is no limit as to when the second personal key and the second public key of the second electronic device 300 may be generated. Furthermore, the first electronic device 100 also may generate the first personal key and the first public key. As described above, there is no limit as to when the first personal key and the first public key of the first electronic device 100 may be generated.

At operation S307, the first electronic device 100 may receive the second public key.

At operation S309, the first electronic device 100 may store the second public key. According to various embodiments of the present disclosure, the first electronic device 100 may compare the generated random number with the number received from the second electronic device 300. As a result of the comparison between the generated random number and the number received from the second electronic device 300, if the generated random number and the number received from the second electronic device 300 are identical, then the first electronic device 100 may proceed to operation S311 at which the first electronic device 100 may transmit the first public key to the second electronic device 300.

At operation S313, the second electronic device 300 may receive and store the first public key.

As described above, the first electronic device 100 and the second electronic device 300 may perform mutual authorization. According to various embodiments of the present disclosure, the first electronic device 100 may store the public key of the second electronic device 300, and the second electronic device 300 may store the public key of the first electronic device 100. Therefore, the first electronic device 100 and the second electronic device 300 may share the encryption key.

Figure 5:
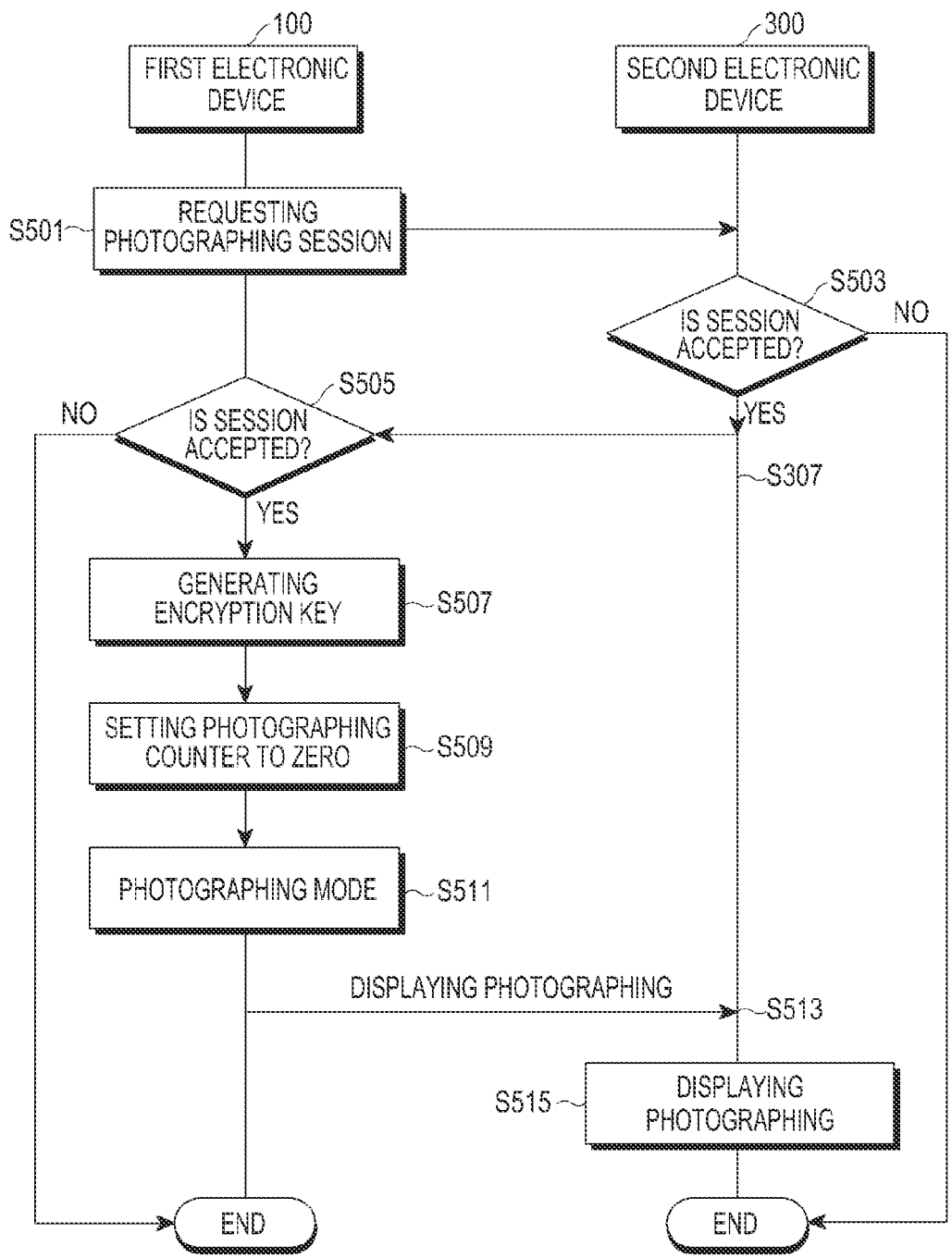
FIG. 5 is a flowchart illustrating operations of a first electronic device and a second electronic device according to an embodiment of the present disclosure.

FIG. 5 is a flowchart illustrating operations of a first electronic device and a second electronic device according to an embodiment of the present disclosure. FIGS. 6A, 6B, 6C, and 6D are conceptual views illustrating operations of a first electronic device and a second electronic device such as, for example, the first electronic device and the second electronic device illustrated in FIG. 5 according to the embodiment of the present disclosure.

Referring to FIG. 5, a flowchart illustrating a process in which the first electronic device 100 acquires content is provided. For example, FIG. 5 illustrates a flowchart illustrating a process in which the first electronic device 100 photographs a subject.

At operation S501, the first electronic device 100 may request the second electronic device 300 to acquire the content. For example, the first electronic device 100 may request the second electronic device 300 to form a session for photographing. For example, the first electronic device 100 may transmit a signal of requesting for a session including an IP address, an MAC address or information on a use channel of a short-range communication scheme, to the second electronic device 300.

Figure 6A:
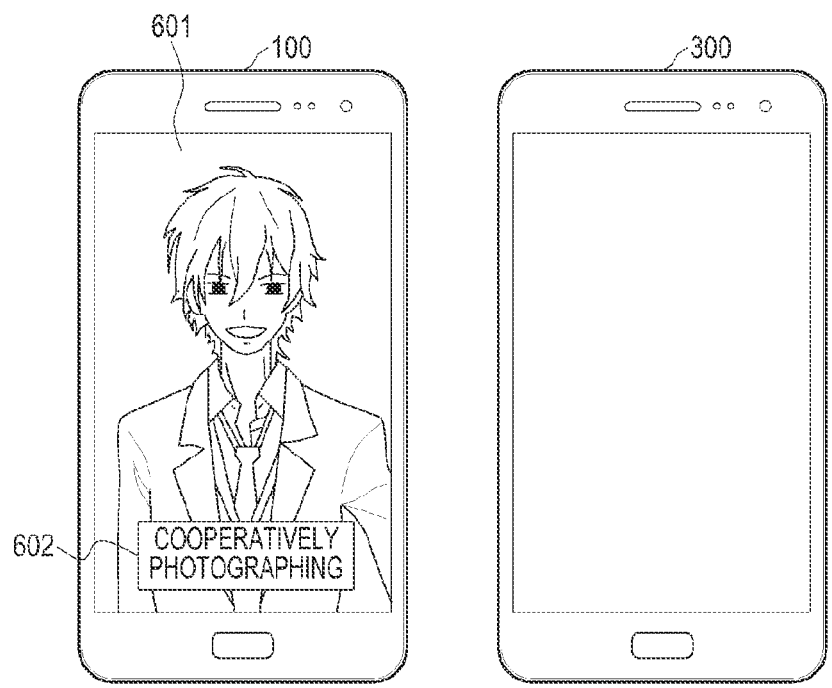
FIGS. 6A, 6B, 6C, and 6D are conceptual views illustrating operations of a first electronic device and a second electronic device such as, for example, the first electronic device and the second electronic device illustrated in FIG. 5 according to the embodiment of the present disclosure.

Referring to FIG. 6A, according to various embodiments of the present disclosure, the first electronic device 100 may display an image 601 captured by the camera module 150 and a cooperative photographing request key 602. As an example, the first user may designate the cooperative photographing request key 602, and the first electronic device 100 may transmit a session request signal to the second electronic device 300 in correspondence to the designation.

Figure 6B:
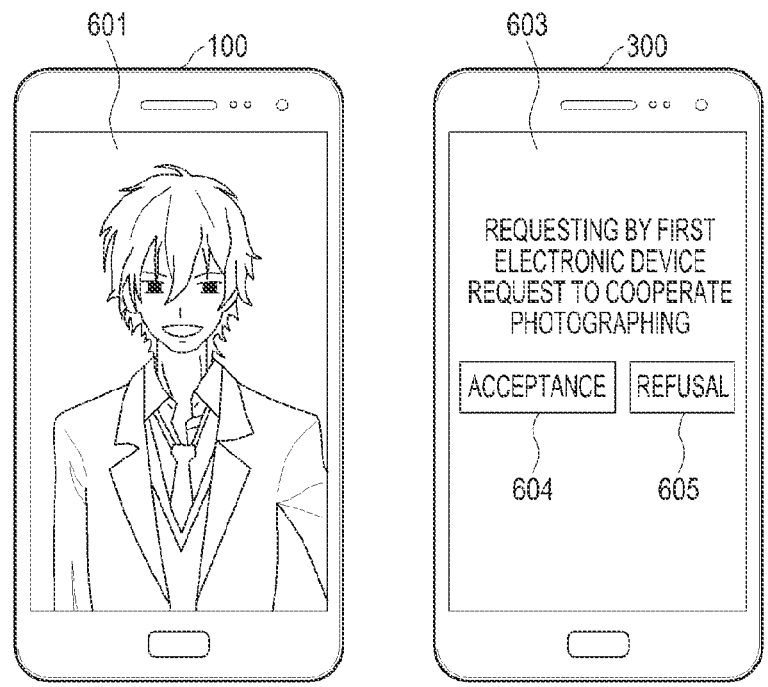

At operation S503, the second electronic device 300 may determine whether to accept the request to form the session for photographing. For example, the second electronic device 300 may accept or refuse formation of the session in response to the session requesting signal. As an example, as illustrated in FIG. 6B, the second electronic device 300 may display a screen 603 on which the first electronic device requests the cooperative photographing. Furthermore, the second electronic device 300 may display acceptance key 604 and a refusal key 605 for session formation together. According to various embodiments of the present disclosure, the second electronic deice 300 may query a user thereof as to whether the user wishes to accept or refuse the request to form the session for photographing.

The second user may designate the acceptance key 604 or the refusal key 605, so as to control the second electronic device 300 to accept or refuse the formation of the session.

If the second electronic device 300 determines to accept the formation of the session at operation S503, then, at operation S505, the first electronic device 100 may determine whether to accept the formation of the session. If the first electronic device 100 determines not to accept the formation of the session at operation S505, then the first electronic device 100 may end the process. In contrast, if the first electronic device 100 determines to accept the formation of the session at operation S505, then the first electronic device 100 may proceed to operation S507 at which the first electronic device may generate the encryption key.

According to various embodiments of the present disclosure, operation S505 may be omitted. For example, the first electronic device 100 may generate the encryption key immediately when the first electronic device 100 receives the acceptance of the formation of the session from the second electronic device 300.

At operation S509, the first electronic device 100 may set a photographing count to zero.

At operation S511, the first electronic device 100 may enter a photographing mode. According to various embodiments of the present disclosure, as illustrated in FIG. 6C, the first electronic device 100 may display a photographing mode screen an image 601 captured by the camera module 150 and a photographing key 610.

At operation S513, the first electronic device 100 may transmit a signal indicating that the first electronic device 100 is performing the photographing to the second electronic device 300.

Figure 6C:
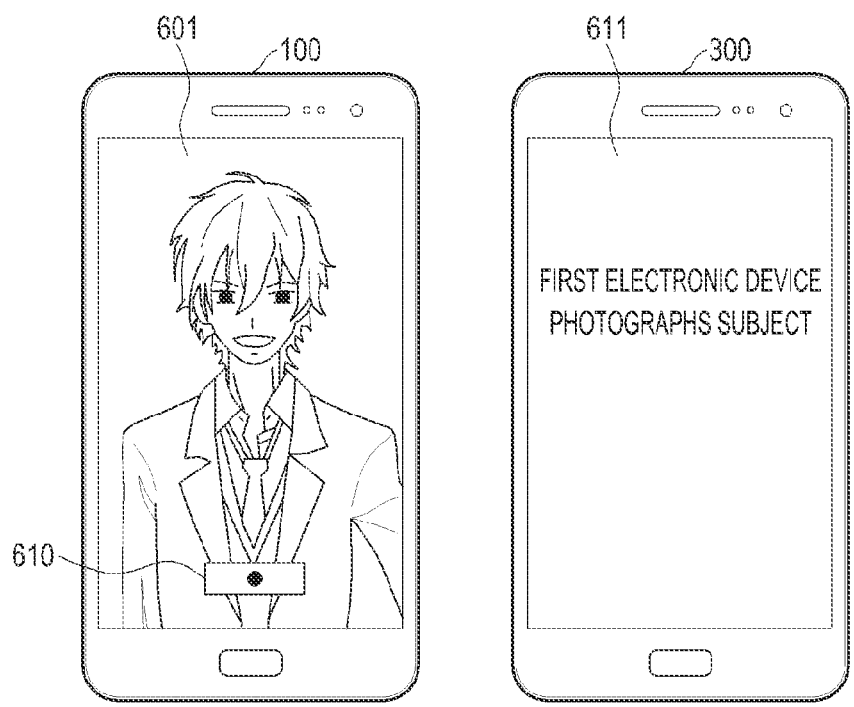

At operation S515, as illustrated in FIG. 6C, the second electronic device 300 may display a screen 611 indicating that the first electronic device is currently performing the photographing based on the received signal.

Figure 6D:
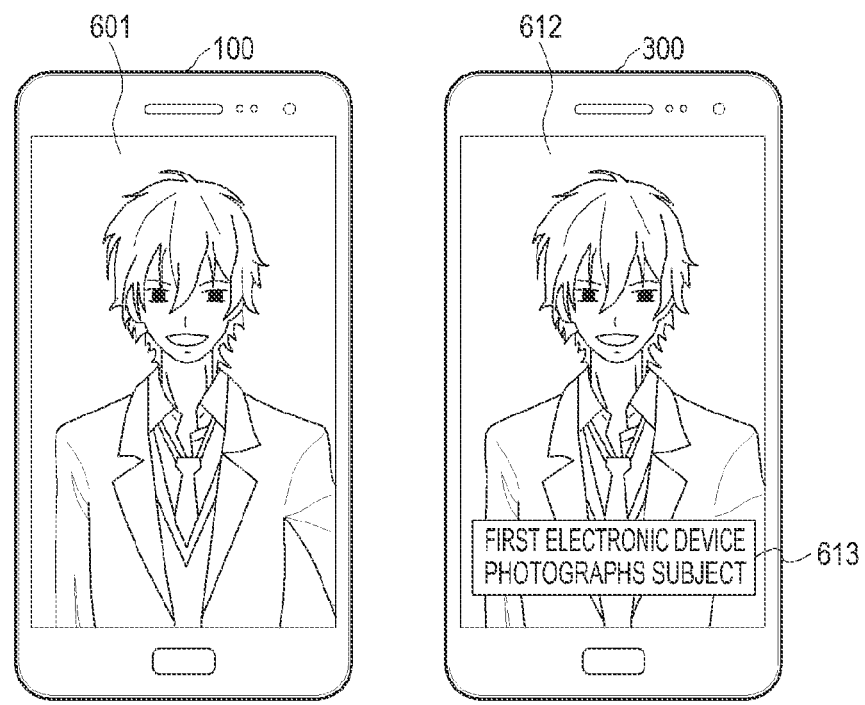

According to various embodiments of the present disclosure, a first electronic device 100 may transmit a signal indicating that the first electronic device is performing the photographing and an image being photographed to a second electronic device 300. For example, as illustrated in FIG. 6D, the second electronic device 300 may display the received image 612 and a window 613 indicating that the first electronic device 100 is performing the photographing together. Accordingly, the second user may identify that the first electronic device 100 acquires the content such as a photograph which requires permission to be reproduced.

Hereinafter, a process of generating the encryption key, for example, based on the Diffie-Hellman algorithm performed at operation S507 will be described in more detail.

Firstly, the first electronic device 100 may previously select and share integers of p and q with the second electronic device 300. According to various embodiments of the present disclosure, g may be one of integers from 1 to p−1. The first electronic device 100 generates the first personal key of a. The first electronic device 100 generates the first public key by using Equation (1).

$$A = g^a \bmod p \qquad \text{Equation (1)}$$

For example, the first electronic device 100 generates the public key A which is a remainder of dividing $g^a$ by p. In addition, the second electronic device 300 generates the second personal key of b, in which the second public key is generated by Equation (2).

$$B = g^b \bmod p \qquad \text{Equation (2)}$$

For example, the first electronic device 100 generates the public key B which is a remainder of dividing $g^b$ by p. According to various embodiments of the present disclosure, in the process of FIG. 3, the first electronic device 100 and the second electronic device 300 may exchange the first public key A and the second public key B.

According to various embodiments of the present disclosure, at operation S507, the first electronic device 100 may generate the encryption key by Equation (3).

$$C = B^a \bmod p \qquad \text{Equation (3)}$$

For example, the first electronic device 100 generates the public key C which is a remainder of dividing $B^a$ by p. The second electronic device 300 may also generate the encryption key by Equation (4).

$$C = A^b \bmod p \qquad \text{Equation (4)}$$

For example, the second electronic device 300 generates the public key C which is a remainder of dividing $A^b$ by p.

Because the value calculated by Equations (3) and (4) is $g^{ab} \bmod p$ (e.g., C), the first and second electronic devices 100 and 300 may generate and hold an identical encryption key.

However, the encryption process based on the Diffie-Hellman algorithm is merely an example, and may be easily replaced with an encryption process based on an RSA algorithm and may be applied to the present disclosure, by those skilled in the art. It may be understood by those skilled in the art that the scope of the various embodiments of the present disclosure are not limited by the encryption process using the Diffie-Hellman algorithm.

In addition, as described above, when the first electronic device 100 requests the second electronic device 300 to form a session, the first electronic device 100 and the second electronic device 300 may form the session. The first electronic device 100 may store information on the previously formed session, and generate another encryption key each time when a session is formed.

For example, it is assumed that the first electronic device 100 has formed first and second sessions and attempts to generate a third session. The first electronic device 100 may store information on the first and second sessions. Accordingly, if the first electronic device 100 newly forms the third session, a new encryption key may be generated which is different from the encryption keys used in the first session and the second session. For example, the first electronic device may set different values of p and q to each of the first session, the second session, and the third session, and generate a different encryption key for each session.

As described above, using a different encryption key in each session may have an effect in enhancing the security. In addition, although FIG. 5 illustrates only the photograph with relation to the content, it is apparent that the scope of the various embodiments of the present disclosure is not limited to the photograph. For example, referring to FIG. 5, at operation S509 in which the photographing count is set to zero, the photographing count may be substituted with a voice recording count or a video recording count, which is set to zero. In addition, at operation S511 at which a photographing mode is entered, the photographing mode is replaced with a voice recording mode or a video recording mode. In these cases, the electronic device 100 may execute a voice recording application or a video recording application.

Figure 7:
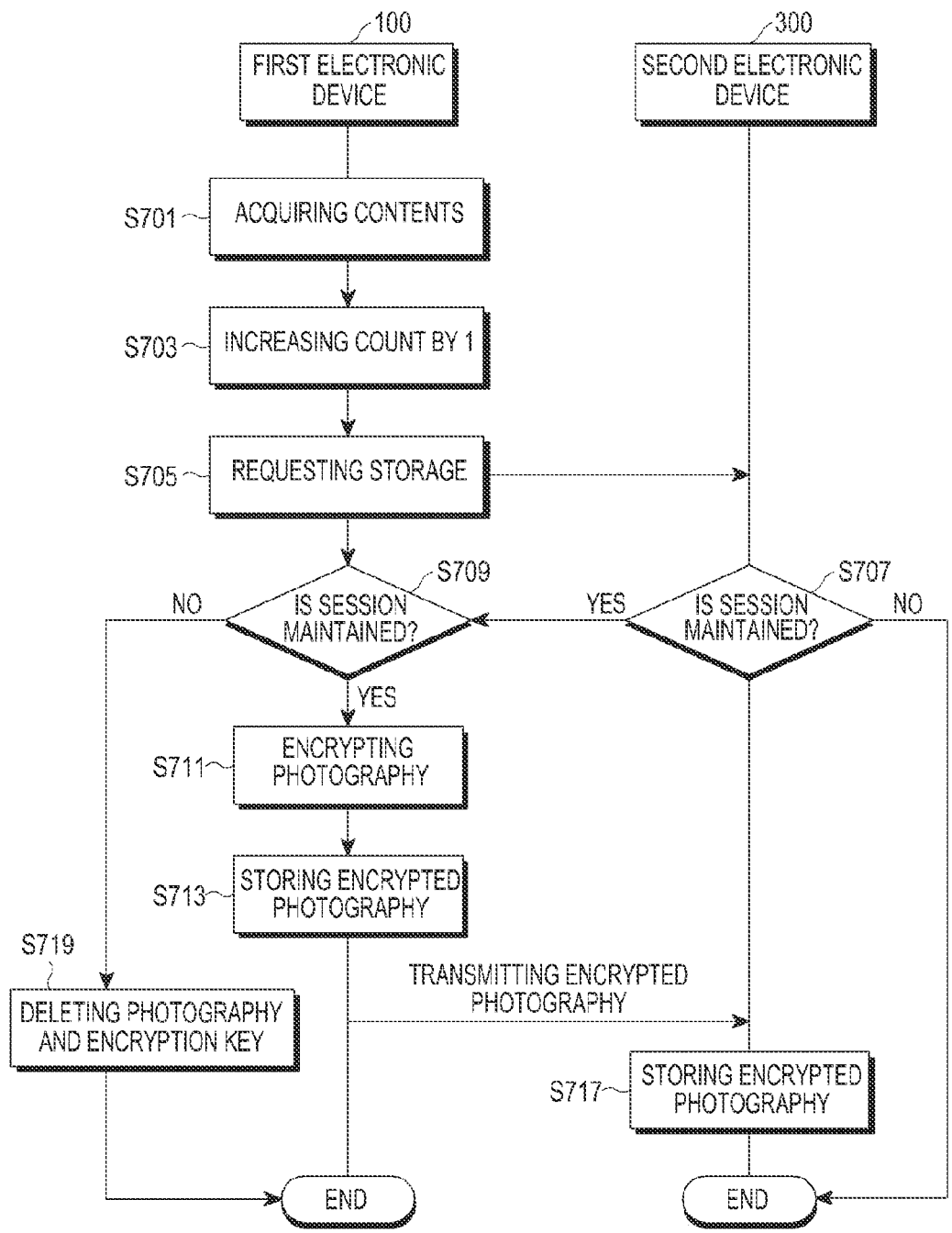
FIG. 7 is a flowchart illustrating a process of acquiring and encrypting content according to an embodiment of the present disclosure.

FIG. 7 is a flowchart illustrating a process of acquiring and encrypting content according to an embodiment of the present disclosure.

Referring to FIG. 7, the process of acquiring and encrypting the content of will be described in more detail with reference to FIGS. 8A, 8B, and 8C.

Figure 8A:
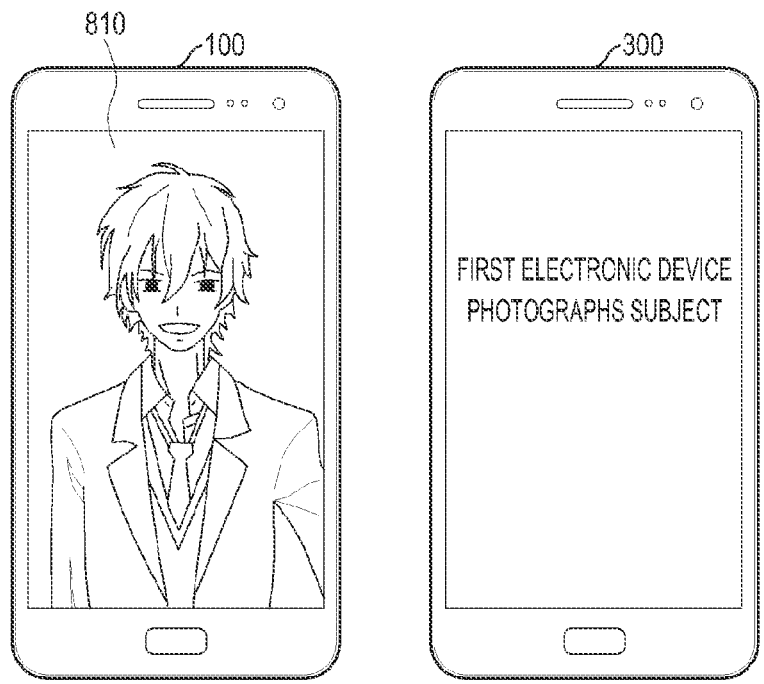
FIGS. 8A, 8B, and 8C are conceptual views illustrating a process of acquiring and encrypting content in electronic devices according to an embodiment of the present disclosure.
Figure 8B:
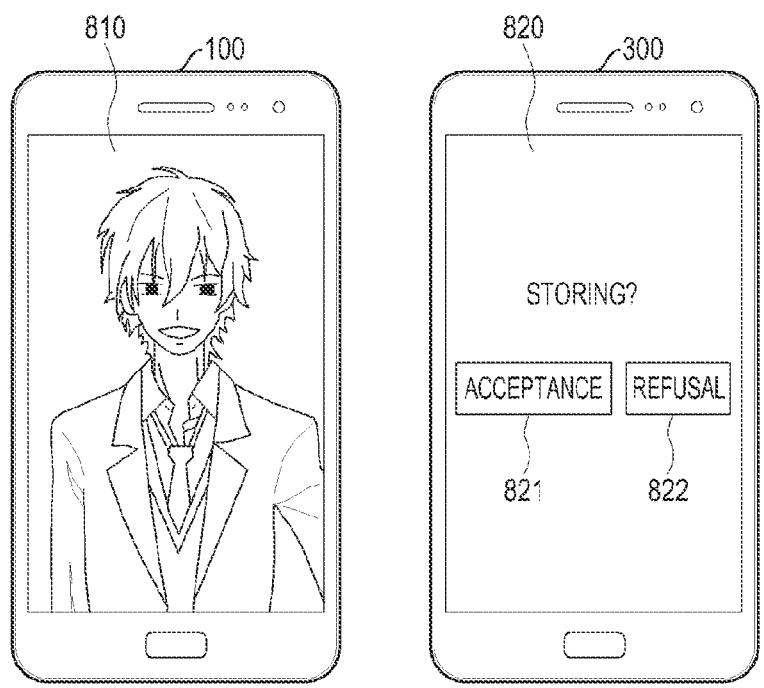
Figure 8C:
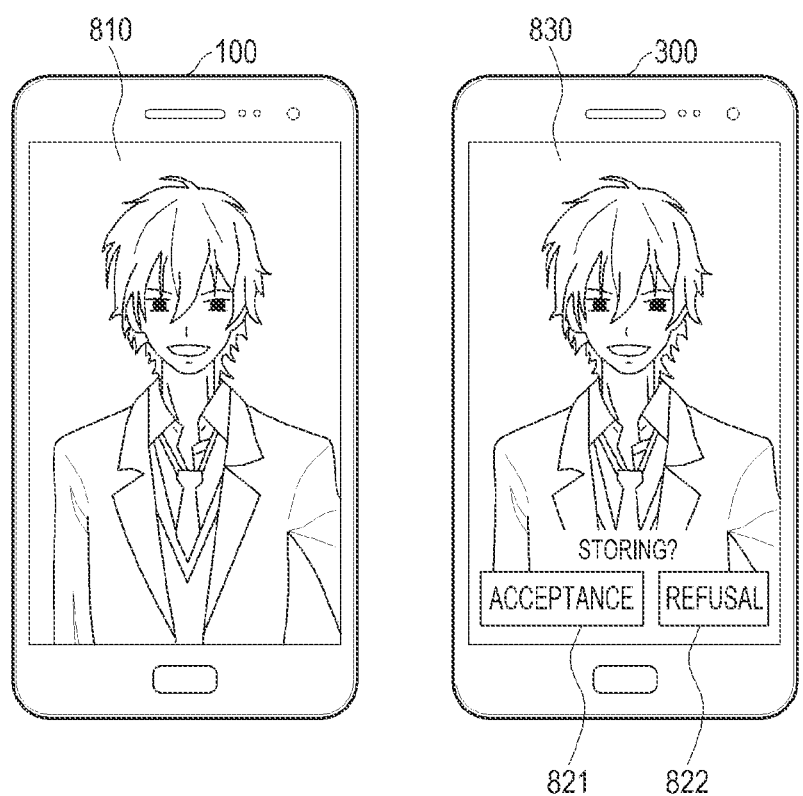

FIGS. 8A, 8B, and 8C are conceptual views illustrating a process of acquiring and encrypting content in electronic devices according to an embodiment of the present disclosure.

Referring to FIG. 7, a flowchart illustrating a process in which the first electronic device 100 acquires and encrypts the content is provided. For example, FIG. 7, a flowchart illustrating a process in which the first electronic device 100 acquires, through photographing, and encrypts the content.

At operation S701, the first electronic device 100 may take a picture. For example, as illustrated in FIG. 6C, a photographing key 610 may be displayed on the first electronic device 100 as shown in FIG. 6C, and the user may take a desired picture by designating the photographing key 610. As illustrated in FIG. 8A, the first electronic device 100 may display a captured photograph 810. In addition, the second electronic device 300 may display a screen 611 of indicating that the first electronic device 100 is performing the photographing.

At operation S703, the first electronic device 100 may increase the photographing count by 1 after photographing.

At operation S705, the first electronic device 100 may transmit a signal of requesting the second electronic device 300 to store the captured photograph in the second electronic device 300. According to various embodiments of the present disclosure, the storage requesting signal may include an aspect of storing the photograph captured by the first electronic device 100, or may be transmitted along with data of the captured photograph.

Upon receiving the storage requesting signal, at operation S707, the second electronic device 300 may determine whether the session formed between the first electronic device 100 and the second electronic device 300 is maintained. For example, as illustrated in FIG. 8B, the first electronic device 100 may display a screen 820 inquiring of whether the session is to be maintained. The screen 820 inquiring of whether the session is to be maintained may include the acceptance key 821 and the refusal key 822. For example, the second electronic device 300 may query a user thereof for an indication as to whether, the user wishes to accept the storage request. The second user may designate one of the acceptance key 821 or the refusal key 822 so as to control whether the session between the first and second electronic devices 100 and 300 is to be maintained.

According to various embodiments of the present disclosure, as illustrated in FIG. 8C, a second electronic device 300 may additionally display a captured photograph 830.

If the second electronic device 300 determines that the session is to be maintained operation S707, then, at operation S709, the first electronic device 100 may determine whether to maintain the session. If the first electronic device 100 determines to maintain the session at operation S709 (e.g., if both the first electronic device 100 and the second electronic device 300 determine that the session is to be maintained), then the first electronic device 300 may proceed to operation S711 at which the first electronic device 100 may encrypt the captured photograph. For example, the first electronic device 100 may encrypt the photograph based on the encryption key generated at operation S507.

At operation S713, the first electronic device 100 may store the encrypted photograph.

At operation S715, the first electronic device may transmit the encrypted photograph to the second electronic device 300.

At operation S717, the second electronic device 300 may store the encrypted photograph.

In contrast, if the first electronic device 100 determines not to maintain the session at operation S709, then the first electronic device 100 may proceed to operation S719 at which the first electronic device 100 may delete the photograph and the encryption key.

According to the above described process, the photograph captured by the first electronic device 100 may be encrypted and stored after the second electronic device 300 permits the maintenance of the session. Accordingly, if the second user does not want to store the photograph captured by the first user, the first electronic device 100 may be controlled to delete the photograph immediately. Because the asymmetric encryption key based on the Diffie-Hellman algorithm or the RSA algorithm is used in the encryption process as described above, privacy may be sufficiently protected.

Although FIG. 8 illustrates the process of capturing and encrypting only the photograph, it is understood by those skilled in the art that the process of capturing and encrypting the photograph may be applied to a process of acquiring and encrypting other content such as a process of recording and encrypting a video and a process of recording and encrypting a voice.

Figure 9:
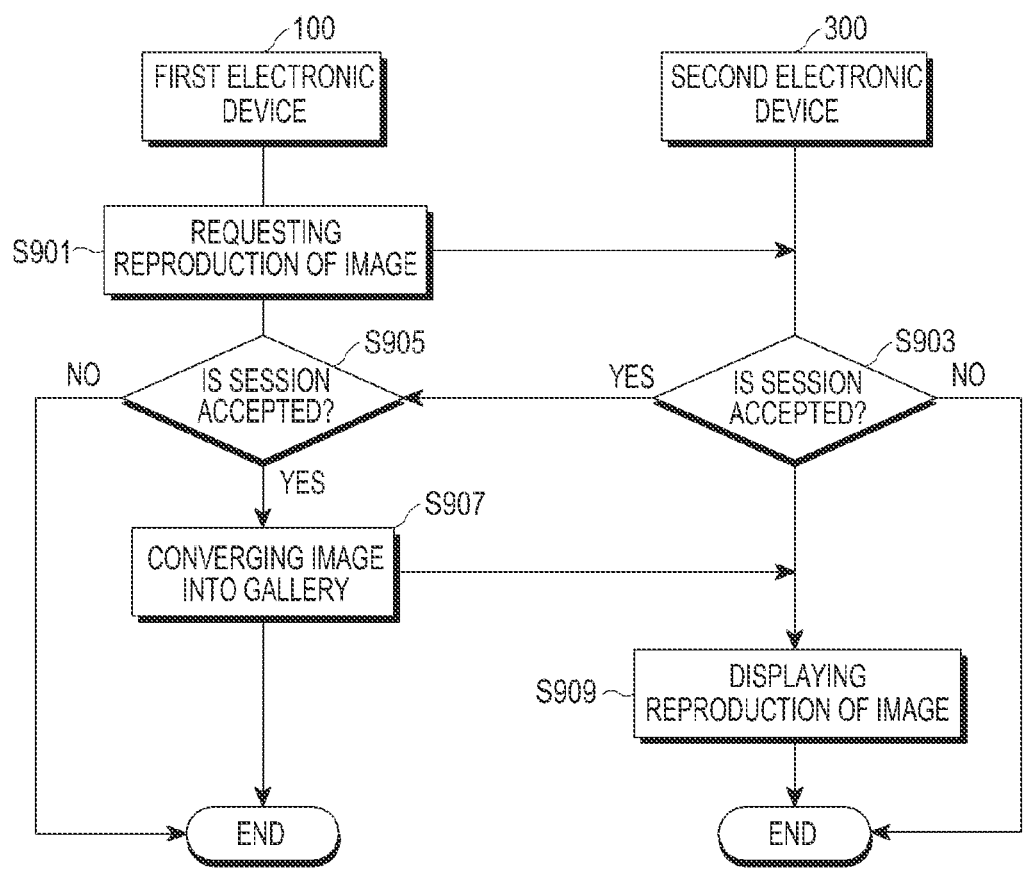
FIG. 9 is a flowchart illustrating a process of reproducing content according to an embodiment of the present disclosure.

FIG. 9 is a flowchart illustrating a process of reproducing content according to an embodiment of the present disclosure.

Referring to FIG. 9, the process of reproducing the content will be described in detail with reference to FIGS. 10A, 10B, and 10C.

Figure 10A:
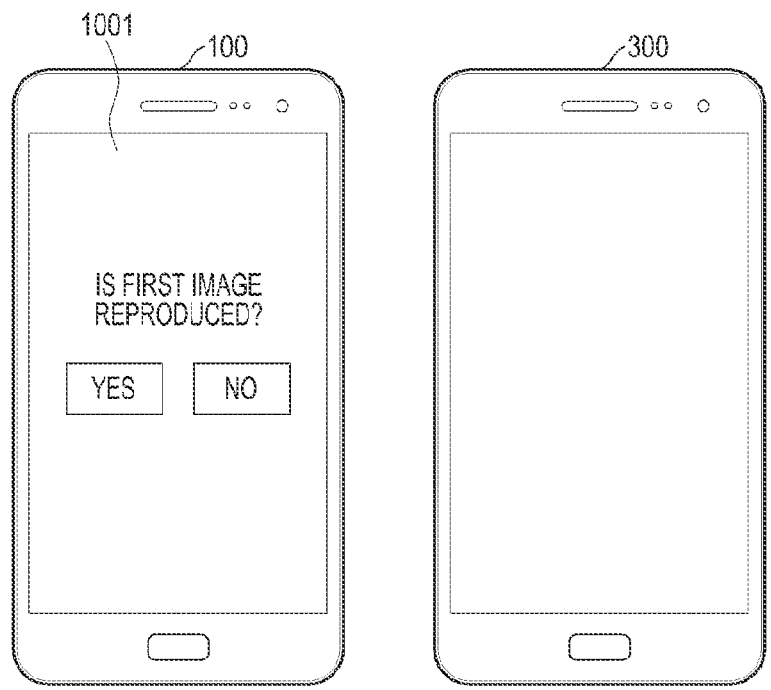
FIGS. 10A, 10B, and 10C are conceptual views illustrating a process of reproducing content in electronic devices according to an embodiment of the present disclosure.
Figure 10B:
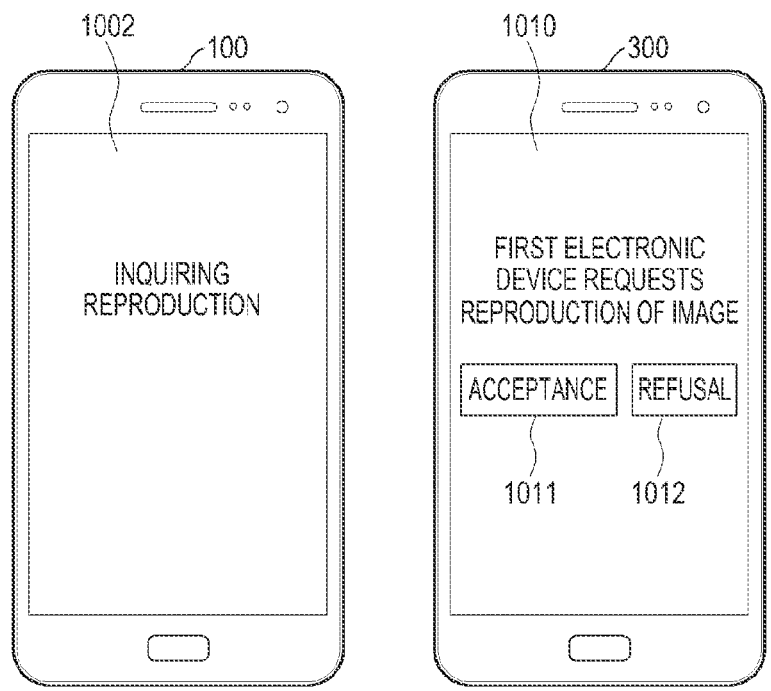
Figure 10C:
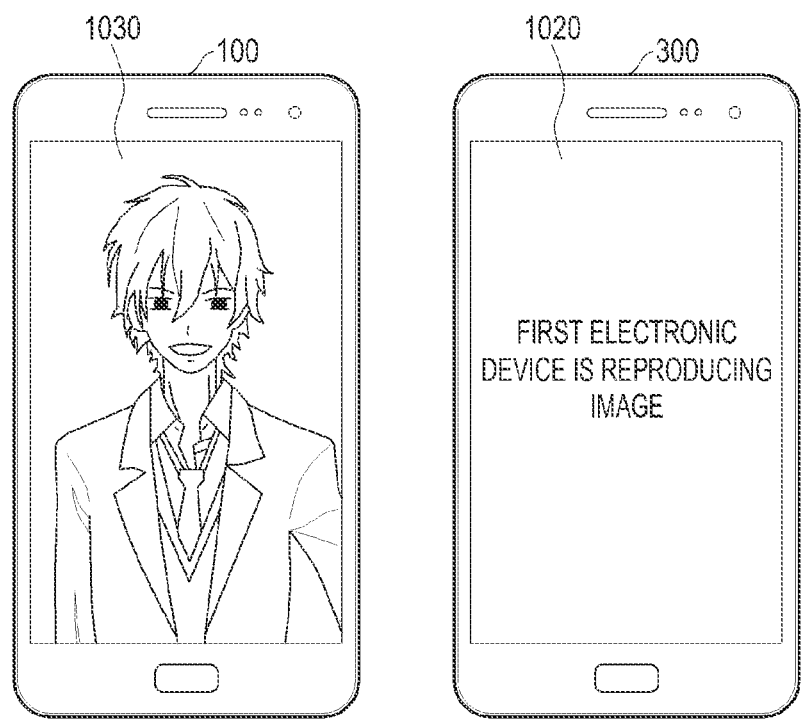

FIGS. 10A, 10B, and 10C are conceptual views illustrating a process of reproducing content in electronic devices according to an embodiment of the present disclosure. As an example, FIG. 9 is a flowchart illustrating a process in which the first electronic device 100 reproduces content a photograph.

At operation S901, the first electronic device 100 may transmit a signal of requesting the second electronic device 300 to reproduce the content such as the photograph to the second electronic device 300. According to various embodiments of the present disclosure, the content reproduction requesting signal may include at least one of information on the content requested to be reproduced and information on the session used in acquiring the corresponding content. For example, as illustrated in FIG. 10A, the first electronic device 100 may display a screen 1001 inquiring of whether a first photograph is reproduced. If a user's instruction of reproducing the encrypted photograph is input, the first electronic device 100 may display a screen inquiring of whether the photograph is reproduced, instead of the reproduction of the photograph, as shown in FIG. 10A.

If the second electronic device 300 receives the content reproduction requesting signal, then, as illustrated in FIG. 10B, the second electronic device 300 may display a screen inquiring of whether the formation of the session is accepted in response to the signal. For example, the screen 1010 inquiring of whether the formation of the session is accepted may include the acceptance key 1011 and the refusal key 1012. Contemporaneously, the first electronic device 100 may display screen 1002 indicating that the process of inquiring as to whether the second electronic device 300 accepts the content reproduction.

The second user may permit the content reproduction request, and designate the acceptance key 1011 corresponding to the permission.

At operation S903, the second electronic device 300 determines whether to maintain the formation of the content reproduction session.

If the second electronic device 300 determines that the formation of the content reproduction session is to be maintained at operation S903 (e.g., a signal of permitting the formation of the session is received), then, at operation S905, the first electronic device 100 may determine whether the session is accepted (e.g., determine the formation of the session).

If the first electronic device 100 determines that the session is not accepted (e.g., that the session is not formed) at operation S905, then the first electronic device 100 may end the process.

In contrast, if the first electronic device 100 determines that the session is accepted (e.g., that the session is formed) at operation S905, then at operation S907, the first electronic device 100 may execute a gallery application. The first electronic device 100 may decrypt and display the encrypted photograph.

At operation S909, the second electronic device 300 may indicate that the first electronic device 100 reproduces the photograph. For example, as illustrated in FIG. 10C, the first electronic device 100 may decrypt the encrypted photograph and display the decrypted photograph 1030. The second electronic device 300 may display a screen 1020 indicating that the first electronic device reproduces the photograph. The decryption process will be described in more detail with reference to FIG. 11.

Figure 11:
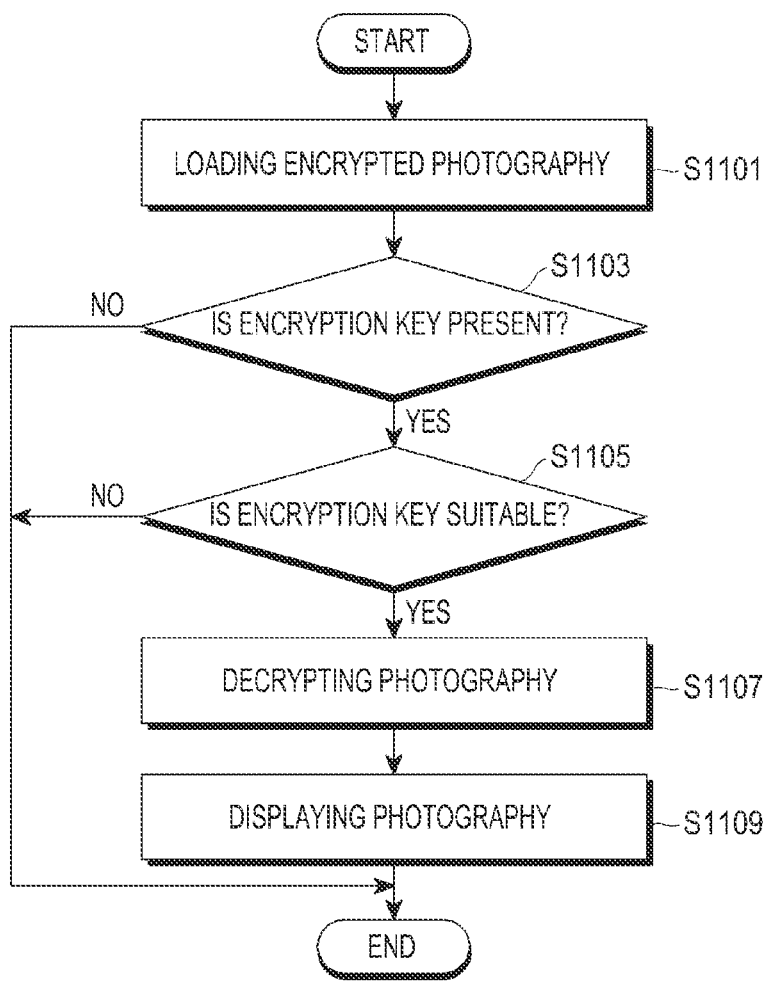
FIG. 11 is a flowchart illustrating a decryption process according to an embodiment of the present disclosure.

FIG. 11 is a flowchart illustrating the decryption process according to an embodiment of the present disclosure.

Referring to FIG. 11, at operation S1101, the electronic device 100 may receive an instruction of reproducing the encrypted content, and load the encrypted content in response to the instruction.

At operation S1103, the electronic device 100 may determine whether the encryption key is present.

If the electronic device 100 determines that the encryption key is not present at operation S1103, then the electronic device may end the decryption process.

In contrast, if the electronic device 100 determines that the encryption key is present at operation S1103, then the electronic device 100 proceeds to operation S1105 at which the electronic device 100 may determine whether the present encryption key is suitable.

If the electronic device 100 determines that encryption key is not suitable at operation S1105, then the electronic device 100 may end the decryption process.

In contrast, if the electronic device 100 determines that the encryption key is suitable at operation S1105, then the electronic device 100 may proceed to operation S1107 at which electronic device 100 may decrypt the content.

At operation S1109, the electronic device 100 may output the decrypted content.

According to various embodiments of the present disclosure, the electronic device 100 may perform the decryption by using the encryption key used in the encryption process. As described above, the content reproduction requesting signal may include at least one of information on the content requested to be reproduced and information on the session used in acquiring the corresponding content. Accordingly, the electronic device 100 may read the encryption key corresponding to the corresponding session, and perform the decryption using the read encryption key.

It may be appreciated that the various embodiments of the present disclosure can be implemented in software, hardware, or a combination thereof. Any such software may be stored, for example, in a volatile or non-volatile storage device such as a ROM, a memory such as a RAM, a memory chip, a memory device, or a memory Integrated Circuit (IC), or a recordable optical or magnetic medium such as a CD, a DVD, a magnetic disk, or a magnetic tape, regardless of the ability thereof to be erased or its ability to be re-recorded. In addition, it will be appreciated that the various embodiments of the present disclosure may be implemented by a computer or a portable terminal which includes a control unit and a memory, in which the memory may be an example of a storage medium that is readable by a machine that is suitable for storing one or more programs that include instructions for implementing the various embodiments of the present disclosure. Accordingly, the present disclosure includes a program for a code implementing the apparatus and method described in the appended claims of the specification and a non-transitory machine-readable (e.g., a non-transitory computer-readable) storage medium for storing the program. Moreover, such a program as described above can be electronically transferred through an arbitrary medium such as a communication signal transferred through cable or wireless connection, and the present disclosure properly includes the things equivalent thereto.

Further, the device can receive the program from a program providing apparatus connected to the device wirelessly or through a wire and store the received program. The program supply apparatus may include a program that includes instructions to execute the various embodiments of the present disclosure, a memory that stores information or the like required for the various embodiments of the present disclosure, a communication unit that conducts wired or wireless communication with the electronic apparatus, and a control unit that transmits a corresponding program to a transmission/reception apparatus in response to the request from the electronic apparatus or automatically.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of controlling a first electronic device, the method comprising:
    establishing a session with a second electronic device;
    transmitting a request for a second public key used for encrypting a photographed image to the second electronic device;
    receiving the second public key corresponding to the second electronic device;
    generating an encryption key based on a first personal key corresponding to the first electronic device and the second public key;
    photographing an image;
    encrypting the image based on the encryption key and storing the encrypted image, if the session is maintained; and
    deleting the image and the encryption key, if the session is not maintained.

2. The method of claim 1, further comprising:
    identifying that the second electronic device comprises a subject to photograph the image; and
    transmitting a first public key corresponding to the first electronic device to the second electronic device.

3. The method of claim 2, further comprising:
    generating and displaying a random number, and
    receiving the random number which is input in the second electronic device,
    wherein the transmitting the first public key to the second electronic device comprises:
        comparing the generated random number with the random number input into the second electronic device; and
        transmitting the first public key to the second electronic device if the generated random number and the random number input into the second electronic device are identical.

4. The method of claim 1, wherein in the generating of the encryption key, the encryption key is generated based on an asymmetric encryption algorithm.

5. The method of claim 4, wherein in the generating of the encryption key, the encryption key is generated by using an encryption scheme based on one of a Diffie-Hellman algorithm and an RAS algorithm.

6. The method of claim 1, wherein in the photographing the image, an indication that the first electronic device photographs the image is transmitted to the second electronic device.

7. The method of claim 1, wherein the storing of the encrypted image comprises:
    transmitting an encrypted image storing request to the second electronic device; and
    storing the encrypted image if the second electronic device permits storing of the encrypted image.

8. The method of claim 1, further comprising:
    transmitting the stored and encrypted image to the second electronic device.

9. The method of claim 1, further comprising:
    receiving an instruction of reproducing the encrypted image;
    receiving permission from the second electronic device to reproduce the encrypted image; and
    decrypting and reproducing the encrypted image.

10. The method of claim 9, further comprising:
    transmitting a request for a reproduction of the encrypted image to the second electronic device.

11. The method of claim 10,
    wherein the request for the reproduction of the encrypted image is to request the formation of the session corresponding to the reproduction of the encrypted image, and
    wherein, in the receiving of the permission of storing the encrypted image from the second electronic device, an indication of maintaining the formed session is received.

12. The method of claim 11, wherein in the decrypting and reproducing of the encrypted image, the encrypted image is decrypted based on the encryption key.

13. A first electronic device comprising:
    a communication unit configured to:
        establish a session with a second electronic device,
        transmit a request for a second public key used for encrypting a photographed image to the second electronic device,
        receive a second public key corresponding to the second electronic device from the second electronic device, and
        transmit a first public key corresponding to the first electronic device;
    a camera configured to photograph an image; and
    a controller configured to:
        generate an encryption key based on a first personal key corresponding to the first electronic device and the second public key,
        encrypt the image based on the encryption key and storing the encrypted image, if the session is maintained, and
        delete the image and the encryption key, if the session is not maintained.

14. The first electronic device of claim 13, wherein the communication unit is further configured to:
    transmit a mutual user authorization request to the second electronic device, and
    transmit a first public key corresponding to the first electronic device to the second electronic device.

15. The first electronic device of claim 14, further comprising:
    a touch screen,
    wherein the controller is further configured to generate a random number for the mutual user authorization,
    wherein the touch screen is configured to display the random number for the mutual user authorization,
    wherein the communication unit is configured to receive the random number which is input in the second electronic device, and
    wherein the controller is further configured to:
        compare the generated random number with the random number input in the second electronic device, and
        enable the communication unit to transmit the first public key corresponding to the first electronic device to the second electronic device, if the generated random number and the random number input into the second electronic device are identical.

16. The first electronic device of claim 13, wherein the controller is further configured to generate the encryption key based on an asymmetric encryption algorithm.

17. The first electronic device of claim 16, wherein the controller is further configured to generate the encryption key by using an encryption scheme based on one of a Diffie-Hellman algorithm and an RAS algorithm.

18. The first electronic device of claim 13, wherein the communication unit is further configured to transmit an indication that the first electronic device photographs the image to the second electronic device.

19. The first electronic device of claim 13,
wherein the communication unit is further configured to transmit an encrypted image storing request to the second electronic device, and
wherein the controller is further configured to control the storing unit to store the encrypted image when the second electronic device permits storing the encrypted image.

20. The first electronic device of claim 13, wherein the communication unit is further configured to transmit the stored and encrypted image to the second electronic device.

21. The first electronic device of claim 13, further comprising:
a touch screen configured to receive an instruction of reproducing the encrypted image,
wherein the controller is further configured to control to decrypt and reproduce the encrypted image when the second electronic device permits reproducing the encrypted image.

22. The first electronic device of claim 21, wherein the communication unit is further configured to transmit a request for a reproduction of the encrypted image to the second electronic device.

23. The first electronic device of claim 22,
wherein the request for the reproduction of the encrypted image is to request the formation of the session corresponding to the reproduction of the encrypted images, and
wherein the communication unit is further configured to receive an indication of permitting the formation of the session corresponding to the reproduction of the encrypted image.

24. The first electronic device of claim 23, wherein the controller is further configured to decrypt the encrypted image based on the encryption key.

* * * * *